Feb. 17, 1931.  1,793,273
O. ZERK, NOW BY JUDICIAL CHANGE OF NAME O. U. ZERK
AUTOMATIC LUBRICANT CUP AND THE LIKE
Filed July 5, 1923
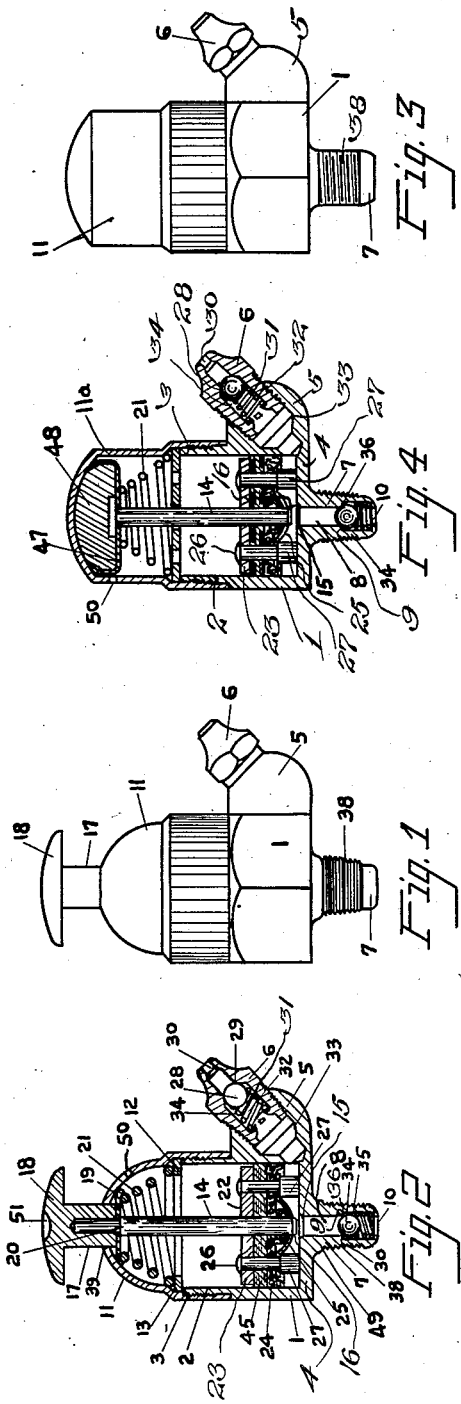
INVENTOR.
Oscar Zerk
BY
Richey, Slough & Watts.
HIS ATTORNEYS Patented Feb. 17, 1931

1,793,273

UNITED STATES PATENT OFFICE

OSCAR ZERK; NOW BY JUDICIAL CHANGE OF NAME OSCAR ULYSSES ZERK, OF CLEVELAND, OHIO, ASSIGNOR, BY MESNE ASSIGNMENTS, TO ALEMITE CORPORATION, OF CHICAGO, ILLINOIS, A CORPORATION OF DELAWARE

AUTOMATIC LUBRICANT CUP AND THE LIKE

Application filed July 5, 1923. Serial No. 649,703.

My invention relates to automatic lubricant cups and particularly to lubricant cups which are adapted to be permanently secured to adjacent machine bearings such as the bearings of an automobile.

An object of my invention is to provide such lubricant cups as are adapted to be charged with grease or oil or other lubricating material and which may be subsequently discharged at intervals to the bearing surfaces, such discharging being accomplished at relatively high pressure.

Another object of my invention is to provide such lubricant cups which may be charged by a lubricant pump or gun which is capable of injecting the lubricant into the cup under pressure.

Another object of my invention is to provide a lubricant storing and dispensing apparatus which, during the active charging of the same with lubricant under pressure, will permit a portion of the lubricant to pass to the bearing surfaces and the rest of the lubricant comprising the charge to be stored within the apparatus for subsequent ejection to the bearing surfaces from the apparatus.

Another object of my invention is to provide an automatic lubricant containing and dispensing cup which will operate to discharge a predetermined amount of lubricant to the bearing surfaces at each like operation of the discharging means therefor and to prevent the inclusion of air with the lubricant during or subsequent to such discharging operation.

Other objects of my invention and the invention itself will be clear from the drawings accompanying this specification and the description of the said drawings contained herein.

Referring to the drawings,

Fig. 1 shows a side elevational view of a lubricant cup embodying the principles of my invention.

Fig. 2 shows a vertical medial sectional view of the embodiment shown in Fig. 1.

Fig. 3 shows a side elevation of a second embodiment of my invention.

Fig. 4 shows a vertical medial longitudinal section of the embodiment illustrated in Fig. 3.

Fig. 5 shows a side elevational view of a third embodiment of my invention.

Fig. 6 shows a longitudinal vertical medial section of the embodiment illustrated in Fig. 5.

Fig. 7 is a bottom plan view of a special washer employed in connection with my invention.

Referring, now, to the drawings and first particularly to Figs. 1 and 2 thereof, which show a first embodiment of my invention at 1, I show a casing having cylindrical side walls 2, the upper outer wall thereof being of reduced diameter and externally threaded as shown at 3. The casing 1 has a bottom wall 4 extending laterally from the lower portion of the casing 1 and above the bottom wall 4 is a lug 5 perforated and the perforation internally threaded for the reception of a lubricant receiving nipple 6.

The bottom wall 4 also has a downwardly extending externally threaded stem 7, the stem 7 having an axial bore 8 having cylindrical side walls and a valve chamber 9 communicating with and disposed below the said bore 8, there being an orifice 10 below the said chamber through which lubricant may pass from the valve chamber to a bearing to be lubricated. At 11 I provide a cover for the cup, said cover having its inner surface adjacent its lower rim internally screw threaded to co-operate with the threads 3 on the casing, whereby the cover 11 may be screwed tightly down onto the casing.

A washer 12 is clamped between the top rim of the casing 1, upon which it rests, and a clamping seat 13 on the cover 11 above the threaded portion thereof. At 14 I show a plunger axially in alignment with the bore 8 of the stem 7 but normally disposed above the orifice 15 of the bottom wall 4 for such bore, the diameter of the plunger 14, except at its beveled end 16, being nearly the same though somewhat smaller than the diameter of the cylindrical bore 8, whereby the plunger 14 when depressed, as will be later described, and caused to enter the bore 8, will make a tight substantially leak-proof fit with the cylindrical walls of the bore 8. The other end of the plunger 14 has rigidly affixed thereto a handle 17 and an enlarged knob 18.

A washer 19 is clamped tightly against the lower marginal portion of the end of the handle 17 by a shoulder 20 on the upper end of the plunger 14.

Disposed between the washers 19 and 12 of the upper portion of the cups and within the cover 11, I provide a frustro conical shaped coiled compression spring 21, the smaller end of the said spring pressing upwardly against the washer 19, the lower larger portion resting on the upper surface of the washer 12. This construction maintains the plunger 14 in its uppermost position with the outer upper edge of the washer 19 in engagement with the upper adjacent portions of the cover 11.

Within the casing 1, I provide a movable wall 22, said movable wall comprising a metallic washer 23, a cork washer 45, a leather washer 24, a metal washer of special construction later to be described and shown in Fig. 2 at 25, and the clamping studs 26 having enlarged lower ends and making a tight fit therewith so as to secure the special washer 25, the cork washer 45, the leather washer 24, and the metal washer 23 tightly together. The lower ends 27 of the studs 26 project beyond the washer 25 and serve to limit the downward movement of the movable wall.

The nipple 6 is provided with an inlet orifice 30 and a ball valve 28 held by a spring 31 on a seat 29. The valve chamber 32 and interconnecting passageway 33 lead directly to the interior of the casing 1 below the movable wall. A similar ball valve employing a ball 34 and spring 35 is positioned below the cylindrical bore 8 of the stem 7 and bottom wall 4, the ball seat being shown at 36 and the spring 35 which engages the ball 34 to restore it against such seat resting at its outer end against an inwardly extending flange adjacent the orifice 10.

It will be understood that the external threads 38 on the stem 7 permit the entire lubricant containing and dispensing cup to be secured to a shackle bolt or other machine part having bearing surfaces to be lubricated.

Having described the structure of the first embodiment of my invention illustrated partly in Figs. 1 and 2, I will now describe the operation of the same.

In order to charge the lubricant containing cup with a lubricant such as grease, a grease gun, preferably one capable of delivering grease into the nipple 6 through its orifice 30 at high pressure, is brought into discharging relation to the said nipple and the lubricant from the gun is ejected through the said orifice 30 displacing the ball valve 28 against the force of the spring 31 and through the passageway 33 into the space below the movable wall on the interior of the casing 1. The lubricant will fill the space below the movable wall 22 and will lift said wall until the metal washer 23 engages washer 12. Thereafter lubricant will be forced directly to the bearing surface to be lubricated.

After the machine has been in use for some time and the bearing needs additional lubricant, the same can be then supplied from the space below the movable wall by manually depressing the knob 18 thus causing the plunger 14 to pass through the orifice 15 of the bore 8 and to trap the lubricant contained in the bore 8 and push it past the valve 34.

This lubricant ejected by means of the plunger 14 will be ejected at a very high pressure and at a pressure sufficient to cause the lubricant to reach the bearing surfaces, forcing ahead of it old, congealed, gummed lubricant mixed with dirt and dust from the bearing surfaces, such old lubricant being replaced by new lubricant.

After such an operation the spring 21 will restore the plunger 14 and the rigidly secured knob handle 18 to their normal position shown in Fig. 2 and the ball valve 34 immediately closes when the plunger 14 begins its restoring movement. A partial vacuum will first be created in the bore 8 and then as the power of the spring 21 is greater than the atmospheric pressure tending to prevent the withdrawal of the plunger 14, the plunger will be entirely retracted and when the end 16 thereof is lifted above the orifice 15, by virtue of the partial vacuum created in the bore 8, a fresh charge of lubricant will be caused to enter the bore 8 through the orifice 15 and below the beveled end of the plunger 14. The apparatus is now ready for another operation.

It will be noted that the plunger 14 is maintained in vertical axial alignment relative to the walls of the bore 8 by the handle shank 17 having its outer walls engaged by the inner walls of the opening 39 in the cover 11 and also by the plunger. It will be noted that the leather washer 24 is turned downwardly at its periphery so that it will exert outward pressure against the inner walls of the casing 1 and that its inner portion is likewise bowed downwardly so as to exert a lateral inward pressure against the plunger 14.

This construction insures that there will be a tight leak-proof joint to prevent the loss of lubricant from the chamber below the movable wall 22 to the space thereabove. The washer 25, as has been said, is of special construction, being dished in its interior portion and as shown in Fig. 7, which shows a plan view, its interior downwardly dished portion 42 is perforated irregularly there being spaced portions 40 whose edges define portions of a circle. The intermediate portions 41 extend outwardly from the center of the aperture. In this figure the plunger 14 is shown in section and it will be seen that the edge portions of the perforation 40 serve to help to preserve alignment of the plunger 14 and the leather washer 24, the openings through the portion 42 providing openings from the space below the washer 25 to the space thereabove and adjacent to the leather washer 24, to permit lubricant to pass freely to the lower face of such washer, which maintains a tight seal against the walls of the plunger 14 and the walls 2 of the casing.

The leather washer is turned downward at its sealing edges, the larger metal clamping washer 23 and the cork washer being disposed above it, and the clamping washer 25, which has just been described, being disposed below it. The downwardly bent inner marginal portions of the leather washer 24 are received within the downwardly dished portion 42 of such smaller clamping washer. The cork and leather movable wall makes an especially good seal against the leakage of lubricant, cork being a good material to prevent loss of lubricant by capillary attraction. This construction makes the movable wall lubricant leak-proof against high lubricant pressure exerted from below the movable wall as when a high pressure grease gun is applied to the nipple 6, forcing the movable wall upwardly with its marginal down-turned edges tightly pressed by the lubricant against the walls of the casing 1, and against the walls of the plunger 14. The movable wall makes a sufficiently tight contact against such walls when such member is pressed downwardly by the excess of atmospheric pressure on its upper side, subsequent to an ejection of lubricant to the bearing by a downward movement of the plunger 14 through the cylindrical bore 8 as has been described. In the previous description of the operation of the lubricator of my invention, the term "partial vacuum" has been used in describing that force which draws the movable wall downwardly in close contact with the body of lubricant contained in the reservoir after the ejection of a charge of lubricant from the reservoir by means of the plunger 14. The term "partial vacuum" is to be understood as including that action of the pressure of the atmosphere which forces the movable member to rest upon the upper surface of the lubricant as said upper surface is lowered by discharge of lubricant from the reservoir.

As I understand the phenomena, the movable wall is really pressed down by the atmospheric pressure on its upper side maintained by virtue of the free passage of air into the upper chamber above the movable wall through the joint 39 and the opening 50 when the hydraulic pressure below the movable wall is reduced below that of the atmosphere by withdrawal of lubricant. In any event, I find that the movable wall always closely follows the lubricant downward until substantially all of the lubricant has been ejected from the reservoir below the movable wall.

The ends 27 of the spacing studs 26 carried on the movable wall prevent the closure of the port to the passage way 33 in the wall 2 of the casing 1.

Referring now to the embodiment of my invention shown in Figs. 3 to 6, inclusive, and first particularly as shown in Figs. 3 and 4, at 48 I show an actuating weight such as a body of lead carried within a dished metallic cup 47 secured on the end of the plunger 14, instead of the handle knob 18 of the embodiment previously described. The weight 48 is disposed within the cover 11—a rather than without such cover, as in the previous embodiment, as in this form of my invention I rely only upon automatic actuation of the plunger 14. I propose to install the lubricant cups of Figs. 3 to 6, inclusive, on automobiles and communicating with the surfaces thereon to be lubricated, and in the embodiment of Figs. 3 and 4, the cup is mounted with the stem 7 secured in the casing around such bearing in such a way that the lubricant cup will be upright, standing vertical as shown in the figures, and the plunger 14 is downwardly reciprocated at such times as when the motor vehicle being driven over a rough road or striking obstructions such as stones or other "bumps" will cause the weight 48 to be reciprocated downwardly forcing the plunger 14 within the bore 8, ejecting the lubricant through the orifice 10 as decribed in connection with the manual operation of the lubricant cup of the first embodiment of my invention. The retraction of the weight 48 by the spring 21 will produce also the so-called "partial vacuum" or the so-called "excess of atmospheric pressure on the upper side of the movable member."

The ball valve 34—36, as in the said first embodiment, operates automatically to prevent the loss of pressure. In the embodiment of Figs. 5 and 6 I show a lubricator adapted to be secured to the vehicle bearing casing in inverted position, that is, with the lead weight lowermost within the inverted cover 11—b, and adapted to force the plunger 14 upwardly into the bore 8 to discharge lubricant through the discharge orifice 10 whenever the vehicle rebounds, the rebound throwing the weight 48 upward and ejecting lubricant from the bore 8 as described. In the embodiment of Figs. 5 and 6 I show a spring 21 as shown for the other embodiment of my invention, but I may omit the spring 21 or I may make it very weak as compared with the similar spring of the other embodiments of my invention.

I contemplate also securing a spring positioned as is the spring 21 for the embodiment of Figs. 5 and 6 with its ends secured tightly to the washer 12 and the metal dished holder 47, and free of initial tension, and I contemplate, moreover, a form of my invention wherein such a spring will be under slight tension in the normal position illustrated, the tension being insufficient to lift the weight 48, but tending to balance a portion of such weight.

In the embodiments of my invention illustrated in Figs. 1 to 4, inclusive, I show an automatic check valve 34—36 in the discharge passage way for the lubricator, and as shown in the drawings of the embodiment of my invention of Figs. 5 and 6, I do not show such ball valve. I wish it to be understood that I contemplate both forms of my invention, one without the ball valve, and the other with the ball valve, the ball valve being used most advantageously where a relatively fluid lubricant is employed, and where the bearings to be lubricated are relatively loose fitting.

It will be noted that in the embodiments of my invention illustrated, I so position the charging nipples that the charging of such lubricators is accomplished by a "press-on" lubricant charging gun, such as that, for instance, illustrated in my Patent No. 1,475,980, of December 4, 1923. The manual pressure exerted against the end of the nipple will be directed toward the lowermost point of support for the stem 7 of the lubricator casing so that such a charging effort will not tend to push the lubricator out of the bearing casing recess into which it is fitted, but will have the opposite effect of tending to lodge it more firmly in such bearing casing recess. This is of particular advantage when, as contemplated, I may omit the screw threads on the outer surface of the lubricator stems 7, relying upon a tight press fit to force such lubricator into the bearing casing recesses receiving such stem.

Although I have shown the first embodiment of my invention illustrated in Figs. 5 and 6 with the stem 7 in axial alignment with the charging nipple 6, this form of construction can, of course, be employed in connection with the other embodiments of my invention illustrated, also the relative positions of the nipples and stems of the different embodiments can be interchanged whenever desirable. It will be noted also that the approach 15 to the bore 8 into which the plunger 14 is adapted to be projected, is outwardly flared, and that the end 16 of such plunger is tapered. This construction provides for a guiding of the plunger 14 into the bore 8 even though these parts may not be precisely in axial alignment.

Referring particularly to Fig. 2, at 50 I show a small opening through the cover 11, said opening serving to insure that the space above the movable wall is always maintained at atmospheric pressure instead of relying upon the relatively loose fit between the handle shank 17 and the cover 11. Also, in Fig. 2 I show a recess 51 for the knob handle 18 and into which recess the operator may project a screw driver or like tool in order to depress the plunger 14 to lubricate the bearing.

While I have referred to the member 48 in the embodiments of my invention illustrated in Figs. 3 to 6, inclusive, as comprising a weight adapted to actuate the plunger 14 when the lubricator is vibrated, I may also construct the knob 18 of the first embodiment of my invention of such material and of such weight that the lubricator of this embodiment is also capable of being actuated automatically when the lubricator is vibrated as when attached to a vehicle vibrated by being driven over a rough road.

Certain of the subject matter described and illustrated in this application, but not claimed herein, is claimed in my divisional application, Serial No. 683,973, filed January 2, 1924.

Having thus described my invention as embodied in several specific structures, I am aware that numerous and extensive departures may be made from the embodiments herein illustrated and described and mentioned, but without departing from the spirit of my invention.

I claim:

1. A lubricant feeding device comprising a receptacle, a movable wall dividing said receptacle into two non-communicating compartments, one of said compartments providing a lubricant reservoir and the other of said compartments being open to the atmosphere, an outlet conduit adapted to be fitted to an element to be lubricated, said reservoir compartment having an inlet passage extending through the wall thereof adjacent the outlet conduit, an automatic valve for closing the inlet passage in said compartment, a slidably mounted plunger extending into said receptacle and through said movable wall, means for reciprocating said plunger to enter and eject lubricant from said outlet conduit, said conduit being charged from said reservoir compartment when said plunger is removed from said conduit, and means for limiting the travel of said movable wall toward the end of said reservoir compartment to maintain a communication between said inlet passage and said outlet passage.

2. A lubricant feeding device comprising a receptacle, a movable wall dividing said receptacle into two compartments, one of said compartments providing a lubricant reservoir and the other of said compartments being open to atmosphere, an outlet conduit leading from said reservoir compartment, means for charging said reservoir compartment with lubricant, and a plunger for entering and ejecting lubricant from said outlet conduit, said plunger being arranged to be actuated by the movement of said device, said outlet conduit being automatically filled from said reservoir when said plunger is removed from said conduit.

3. A lubricant feeding device comprising a receptacle, a movable wall dividing said receptacle into two compartments, one of said compartments providing a lubricant reservoir and the other of said compartments being open to atmosphere, an outlet conduit leading from said reservoir compartment, means for charging said reservoir compartment with lubricant, and a plunger for entering and ejecting lubricant from said outlet conduit, a weight secured to said plunger, and a yielding connection between said receptacle and said plunger to normally maintain said plunger removed from said outlet conduit, said plunger automatically entering said outlet conduit and ejecting lubricant therefrom when said receptacle is reciprocated, said outlet conduit being charged with lubricant from said lubricant compartment by vacuum when said plunger is removed from said conduit.

4. A lubricant feeding device adapted to be attached to a part to be lubricated and comprising a receptacle having an outlet, a plunger movable into and out of said outlet upon reciprocation of said part, check valve means in said outlet to enable said plunger to develop a vacuum and suck lubricant out of said receptacle, a weight on said plunger, and a movable partition for keeping a mass of lubricant in said receptacle out of contact with said weight.

5. A lubricant feeding device comprising a receptacle having an outlet, a plunger movable into and out of said outlet upon reciprocation of said receptacle, check valve means in said outlet to enable said plunger to develop a vacuum and suck lubricant out of said receptacle, a weight on said plunger, and a movable partition for keeping a mass of lubricant in said receptacle out of contact with said weight, said plunger sliding through said partition.

6. A lubricant feeding device comprising a receptacle, a movable wall dividing said receptacle into two non-communicating compartments, one of said compartments providing a lubricant reservoir and the other of said compartments being open to atmosphere, an outlet conduit extending from the reservoir compartment, said reservoir having a normally closed inlet lubricant charging passage extending through a wall thereof, and means independent of said movable wall for entering and ejecting lubricant from a portion of said outlet conduit, said outlet conduit being automatically refilled with lubricant from said reservoir by the resulting differential pressures in said compartments.

7. A lubricant feeding device comprising a receptacle, a movable wall dividing said receptacle into two non-communicating compartments, one of said compartments providing a lubricant reservoir and the other of said compartments being open to atmosphere, an outlet conduit extending from the reservoir compartment, said reservoir having a normally closed inlet lubricant charging passage extending through a wall thereof, means independent of said movable wall for entering and ejecting lubricant from a portion of said outlet conduit, said outlet conduit being automatically filled with lubricant from said reservoir by differential pressures set up in said compartments, and means for automatically withdrawing and maintaining said ejecting means in a position removed from said outlet conduit portion.

8. In a lubricator, the combination of a casing, a stem therefor adapted to be secured adjacent a machine bearing, a passageway through the stem, a lubricant containing chamber communicating with said passageway, a movable wall for the casing, a valved charging nipple having a lubricant charging passageway leading to the interior of the casing, a reciprocable plunger adapted to eject lubricant from the chamber through the stem passageway, said movable wall being moved under the influence of atmospheric pressure, responsive to such ejection of lubricant to force a new supply of lubricant into said chamber.

In testimony whereof I hereunto affix my signature this 3d day of July, 1923.

OSCAR ZERK,
*Now by judicial change of name Oscar Ulysses Zerk.*